United States Patent
Singh et al.

(10) Patent No.: US 10,248,443 B2
(45) Date of Patent: *Apr. 2, 2019

(54) VIRTUAL MODEM TERMINATION SYSTEM MIGRATION IN A CABLE MODEM NETWORK ENVIRONMENT

(71) Applicant: CISCO TECHNOLOGY, INC., San Jose, CA (US)

(72) Inventors: Amit Singh, Woodside, CA (US); John T. Chapman, Coto de Caza, CA (US); Alon Bernstein, Monte Sereno, CA (US)

(73) Assignee: Cisco Technology, Inc., San Jose, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/807,728

(22) Filed: Jul. 23, 2015

(65) Prior Publication Data
US 2016/0328252 A1 Nov. 10, 2016

Related U.S. Application Data

(60) Provisional application No. 62/156,770, filed on May 4, 2015.

(51) Int. Cl.
*G06F 9/455* (2018.01)
*H04L 12/16* (2006.01)
(Continued)

(52) U.S. Cl.
CPC .......... *G06F 9/455* (2013.01); *G06F 9/45558* (2013.01); *H04L 12/2801* (2013.01);
(Continued)

(58) Field of Classification Search
CPC ....... H04L 67/16; H04L 67/02; H04L 67/101; H04L 12/2801; H04L 12/2885;
(Continued)

(56) References Cited

U.S. PATENT DOCUMENTS 9,258,237 B1 * 2/2016 Smith ................... H04L 47/122
9,430,262 B1 * 8/2016 Felstaine ............ G06F 9/45558
(Continued)

OTHER PUBLICATIONS

Chiosi, et al., "Network Functions Virtualisation," White Paper, SDN and OpenFlow World Congress, Darmstadt-Germany, Oct. 22-24, 2012, 16 pages; http://portal.etsi.org/NFV/NFV_White_Paper.pdf.

(Continued)

*Primary Examiner* — Michael Thier
*Assistant Examiner* — Prince A Mensah
(74) *Attorney, Agent, or Firm* — Merchant & Gould P.C.

(57) ABSTRACT

An example system and method for facilitating virtual cable modem termination system (VCMTS) migration in cable modem network environments is provided and includes spawning, by an orchestration component executing using a processor, a first instance of a virtual network function (VNF) on a first server in a cable modem network, storing state of the first instance as state information in an external database, spawning a second instance of the VNF on a different second server, synchronizing state of the second instance with the state information stored in the external database, and deleting the first instance. In specific embodiments, the VNF comprises a VCMTS.

20 Claims, 5 Drawing Sheets

(51) Int. Cl.
*H04L 12/28* (2006.01)
*H04L 12/46* (2006.01)

(52) U.S. Cl.
CPC .. *H04L 12/4633* (2013.01); *G06F 2009/4557* (2013.01); *G06F 2009/45562* (2013.01)

(58) Field of Classification Search
CPC .... H04L 12/4633; H04L 43/10–43/106; G06F 9/455; G06F 9/45558; G06F 2009/4557; G06F 2009/45562
See application file for complete search history.

(56) References Cited

U.S. PATENT DOCUMENTS

| | | | |
|---|---|---|---|
| 2003/0189898 A1* | 10/2003 | Frick | H04L 45/00 370/227 |
| 2006/0072480 A1 | 4/2006 | Deval et al. | |
| 2015/0271268 A1 | 9/2015 | Finkelstein | |
| 2015/0281054 A1* | 10/2015 | Utgikar | H04L 49/70 709/221 |
| 2015/0331635 A1* | 11/2015 | Ben-Shaul | G06F 9/5061 711/120 |
| 2015/0350062 A1* | 12/2015 | Lindem, III | H04L 45/22 370/220 |
| 2016/0248858 A1* | 8/2016 | Qiu | H04L 67/10 |
| 2016/0277509 A1* | 9/2016 | Qiang | H04L 67/16 |
| 2016/0328251 A1 | 11/2016 | Bernstein et al. | |

OTHER PUBLICATIONS

U.S. Office Action dated Feb. 21, 2017 cited in U.S. Appl. No. 14/807,720, 17 pgs.
U.S. Final Office Action dated Jun. 30, 2017 cited in U.S. Appl. No. 14/807,720, 20 pgs.
U.S. Office Action dated Nov. 9, 2017 cited in U.S. Appl. No. 14/807,720, 20 pgs.
U.S. Notice of Allowance dated May 30, 2018 cited in U.S. Appl. No. 14/807,720, 12 pgs.

* cited by examiner

FIG. 6

VIRTUAL MODEM TERMINATION SYSTEM MIGRATION IN A CABLE MODEM NETWORK ENVIRONMENT

CROSS-REFERENCE TO RELATED APPLICATION

This application claims the benefit of priority under 35 U.S.C. § 119(e) to U.S. Provisional Patent Application Ser. No. 62/156,770, filed on May 4, 2015 and entitled VIRTUAL CABLE MODEM TERMINATION SYSTEM MIGRATION AND REDUNDANCY, the disclosure of which is hereby incorporated by reference in its entirety.

TECHNICAL FIELD

This disclosure relates in general to the field of communications and, more particularly, to virtual Cable Modem Termination System (VCMTS) migration in a cable modem network environment.

BACKGROUND

Network functions virtualization (NFV) is a network architecture concept that uses information technology (IT) virtualization related technologies to virtualize network functions into building blocks that may be connected, or chained, to create communication services. NFV relies upon, but differs from, traditional server virtualization techniques such as those used in enterprise IT. A virtualized network function (VNF), may include one or more virtual machines running different software and processes, on top of industry standard high volume servers, switches and storage, or cloud computing infrastructure. For example, a virtualized session border controller function could be deployed to protect a network without typical cost and complexity of obtaining and installing physical units. Other examples of NFV include virtualized load balancers, firewalls, intrusion detection devices and WAN accelerators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example system and method for facilitating virtual cable modem termination system (VCMTS) migration in cable modem network environments is provided and includes spawning (e.g., creating, instantiating, producing, generating, making, etc.) a first instance (e.g., an instance comprises a specific realization of a generic software object) of a virtual network function (VNF) (e.g., implementation of a network function on a virtual machine rather than on a physical specialized hardware) on a first server in a cable modem network (e.g., network that facilitates communication according to cable modem protocols such as Data Over Cable Service Interface Specification (DOCSIS)), storing state of the first instance as state information in an external database, spawning a second instance of the VNF on a different second server, synchronizing (e.g., copying, coordinating, matching, etc.) state of the second instance with the state information stored in the external database, and deleting the first instance. In specific embodiments, the VNF comprises a VCMTS.

As used herein, the term "state" includes configuration settings and communication parameters for communication by the first instance or the second instance and other network elements in the network. In specific embodiments, state includes radio frequency communication parameters (e.g., power level, channels, etc.) and timing settings between a remote physical layer (R-PHY) entity and various cable modems in the cable modem network.

Example Embodiments

Figure 1:
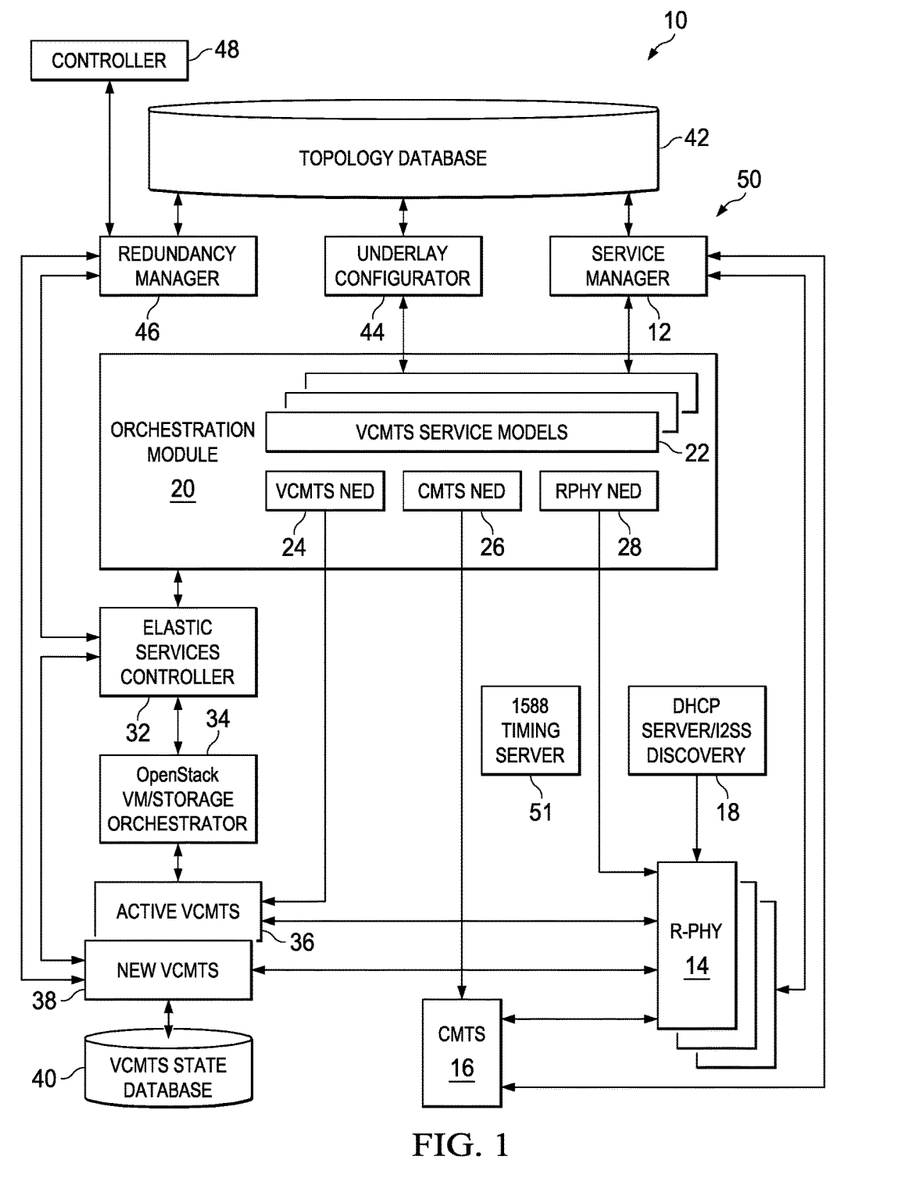
FIG. 1 is a simplified block diagram illustrating a communication system for VCMTS redundancy in a cable modem network environment.

Turning to FIG. 1, FIG. 1 is a simplified block diagram illustrating a communication system 10 for virtual cable modem termination system (VCMTS) migration in accordance with one example embodiment. Communication system 10 supports VCMTS-remote physical layer (R-PHY) network architecture. Communication system 10 includes a service manager 12, one or more R-PHY entity 14, and one or more cable modem termination system (CMTS) 16. A Dynamic Host Configuration Protocol (DHCP) server 18 communicates with R-PHY entity 14. Communication system 10 further includes an orchestration module 20 that comprises VCMTS service models 22, and various network element drivers (NEDs), such as VCMTS NED 24, CMTS NED 26 AND RPHY NED 28.

Orchestration module 20 communicates with an elastic services controller 32 coupled to an OpenStack™ (or any other type) of virtual machine (VM)/storage orchestrator 34, which can spawn an active VCMTS instance 36 and a new VCMTS instance 38, which may communicate with a VCMTS state database (DB) 40. Communication system 10 further includes a topology database 42, an underlay configurator 44, and redundancy manager 46 and a controller 48. Various components of communication system 10 may execute in a data center network 50. A 1588 timing server 51 provides a clock that can be used to synchronize time between VCMTS instances (e.g., active VCMTS instance 36, new VCMTS instance 38) and R-PHY entity 14.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Network function virtualization (NFV) decouples network functions from underlying hardware so they run as software images on commercial off-the-shelf and/or purpose-built hardware. Standard compute, network and storage virtualization technologies are typically used to virtualize the network functions. NFV can reduce dependence on dedicated, specialized physical devices by allocating and using physical and virtual resources only when and where needed. Service providers can thereby reduce overall costs by shifting more components to a common physical infrastructure and optimizing its use, allowing them to respond more dynamically to changing market demands by deploying new applications and services on an as-needed basis. Simple examples demonstrating the NFV concepts include a virtualized firewall or a load balancer. Instead of installing and operating a dedicated appliance to perform the network function, NFV allows service providers or network operators to simply load a software image of the corresponding network function on a VM on demand.

While NFV is applicable to any data plane packet and control plane function in mobile and fixed networks, currently, the concept is applied to switching elements (such as Layer 2 (L2) switches and Layer 3 (L3) routers), mobile network nodes (such as gateways, node e, etc.), tunneling gateway elements (e.g., virtual private network (VPN) gateways), traffic analysis (e.g., deep packet inspection), service assurance, test and diagnostics, converged and network wide functions (e.g., authentication, authorization, and accounting (AAA) server), application level optimization (e.g., load balancers), security services (e.g., firewall) and other such functions that deal with packet routing and processing.

NFV based network services typically require orchestration capabilities. Traditional orchestration, in a broader context of service fulfillment, includes coordinating and aligning business and operational processes in designing, creating, and delivering a specific network service. The orchestration process involves use and management of complex systems and tools such as order, inventory, and resource management systems; configuration and provisioning tools; and operating support systems (OSSs) combined with processes associated with these tools and systems. For example, a typical NFV orchestration system involves a virtual network function (VNF) manager that performs scalable, automated VNF lifecycle management, including creation, provisioning, and monitoring of VNFs.

Typically, orchestration uses principles of software defined networking (SDN), in which control plane processes are decoupled from the data plane and the underlying network infrastructure is abstracted for applications and network services. Typically, in the northbound direction, the SDN control plane provides a common abstracted view of the network to higher level applications and programs, typically using high-level web services-style APIs; in the southbound direction, the SDN control plane programs the forwarding behavior of physical network equipment distributed around the network with device-level protocols or APIs.

Cable modem networks cannot be completely redesigned based on SDN and NFV concepts due to the inherent nature of the network. For example, physical layer functionality (e.g., receiving quadrature amplitude modulated (QAM) signals from cable modems) cannot be virtualized and require dedicated hardware. However, some other network functions can be virtualized, and thus, cable modem networks can include a mix of network functions executing on dedicated hardware and VNFs executing in cloud data centers. For example, Cisco's cBR-8 broadband router supports dedicated hardware for R-PHY, and software supporting SDN and VCMTS in the network.

With virtualization of VCMTS functions, various components of a traditional Converged Cable Access Platform (CCAP) is implemented in a distributed manner in the network. With such virtualization, there may arise a need to migrate (e.g., move) active VCMTS instances from one server to another. For example, migration may be needed for load balancing various virtual machines (VMs) on servers, such that under-utilized VMs are over provisioned on fewer servers, thereby allowing fewer servers to be powered up. In other examples, migration may be needed during server maintenance and upgrades, data center infrastructure maintenance and upgrades, and operational migration of VMs from one data center to another, for example, to balance workloads.

Commercially available VM migration software include vmWare's vMotion,™ and KVM™. The commercial software typically creates a new VM that synchronizes state by copying memory pages from the old VM and then terminating the old VM. However, such mechanisms have several limitations in a cable modem network environment. For example, the new VM must be located in the same subnet of the network as the old VM. The link between the new VM and the old VM must have a maximum latency of 10 ms, thereby limiting the distance between the networks where the new VM can be instantiated.

A dedicated 250 MB/sec link is typically required between the old VM and the new VM to synchronize state quickly as memory pages quickly become dirty. If the VM is not syncing fast enough because memory pages are getting dirty faster than they can be synced over, the central processing unit (CPU) is typically slowed down until convergence occurs, resulting in packet loss if the slow CPU cannot keep up with the pace of packet ingress. Further, the packet queue builds up with consequent packet loss in other parts of the network.

In general, a No eXecution (NX) bit in the CPU must be turned off to facilitate page copy for synchronization. The NX bit disables the CPU from executing in certain pages of memory. Turning it off exposes a security hole because worms download code in data memory via email attachments or other propagation methods and divert CPU execution from those data pages. In addition, with the commercially available migration mechanisms, the VM cannot use direct path input/output (IO) or single root input output virtualization (SR-IOV), as these mechanisms bypass the hypervisor. Thus, the commercially available mechanisms cannot synchronously, efficiently and faultlessly facilitate migration of a VNF from an existing VM to a new VM while the existing VM is active and online and processing packets.

Communication system 10 is configured to address VCMTS migration issues (among others) in a cable modem network environment. According to various embodiments, orchestration module 20 monitors, spawns, and kills instances of VCMTS (e.g., active VCMTS instance 36, new VCMTS instance 38) in data center network 50. Various components of communication system 10, including orchestration module 20 can set up data center network 50 to route traffic to the appropriate VCMTS instance. Data center network 50 includes network infrastructure that connects VMs together and to the outside work (e.g., wide area network). R-PHY entity 14 comprises the physical layer radio frequency components and performs the requisite radio frequency communication functions with cable modems. VCMTS state database 40 provides database services (e.g., query, lookup, etc.) that are backed up, protected and reliable, using known database mechanisms. In various embodiments, active VCMTS instance 36 stores its active state in an instance of VCMTS state database 40. In various embodiments, 1588 timing server 51 acts as a timing master for both active VCMTS instance 36 (and new VCMTS instance 38) and R-PHY entity 14.

According to various embodiments, during operation, orchestration module 20 monitors data traffic to various VMs under its management. Orchestration module 20 may make a determination that active VM instance 36 is to be migrated. The reasons to migrate could include any of the following: it is determined that active VCMTS instance 36 is under-utilized and could be moved to an over provisioned server to conserve resources; the server on which active VCMTS instance 36 is executing is to be upgraded or subject to maintenance; network infrastructure being utilized by active VCMTS instance 36 is to be upgraded or subject to maintenance; active VCMTS instance 36 is to be moved to an alternate data center for workload balancing; etc.

Orchestration module 20 may spawn new VCMTS instance 38 on an appropriate server using elastic services controller 32 and OpenStack VM/Storage orchestrator 34. In some embodiments, new VCMTS instance 38 may be spawned on an over-provisioned server, for example, to conserve resources. In some embodiments, orchestration module 20 may receive instructions from controller 48 or service manager 12 to migrate active VCMTS instance 36. In a general sense, service manager 12 acts as a resource manager managing configuration information, life cycle and location of physical resources such as R-PHY entity 14 and physical CMTS 16. In various embodiments, service manager 12 determines that CMTS 16 with particular configuration settings may be used with R-PHY entity 14 to generate an appropriate CCAP for cable modem transmissions. The particular configuration settings of CMTS 16 may be dependent on signal transmission qualities between R-PHY entity 14 and various cable modems, and other factors. Service manager 12 assigns IP addresses in the network, including management IP address for VCMTS instances in some embodiments and IP tunnel endpoints for tunnels. If service manager 12 does not assign an IP address thereto, R-PHY entity 14 may communicate with DHCP server 18 and obtain a network address therefrom.

Service manager 12 maintains policies to set up one or more VCMTS instances. Service manager 12 triggers orchestration module 20 to create new VCMTS instance 38 in some embodiments. In other embodiments, controller 48 may determine that network traffic is congested, or network resources are not being utilized efficiently, or otherwise determine that active VCMTS instance 36 migration is desired. In some embodiments, orchestration module 20 may generate, extract, or otherwise access the particular configuration settings of desired CMTS 16 in VCMTS service models 22. In some embodiments, VCMTS service models 22 may comprise YANG data models that include different configuration settings for CMTS 16. In a general sense, VCMTS services and devices are modeled, for example, using YANG data models, and their configuration settings are centrally stored in orchestration module 20 as VCMTS service models 22. The configuration settings may include, by way of examples and not as limitations, Day 0 configuration settings that enable building a specific VCMTS instance; Day 1 configuration settings that enable providing network connectivity to the specific VCMTS instance (e.g., Day 1 configuration settings may include time synchronization between VCMTS and R-PHY, etc.); and Day 2 configuration settings that provision the specific VCMTS instance with various services, optimizations, and other parameters that enable particular functionalities in the network.

The configuration settings of the various service and device models are applied to the appropriate devices using corresponding NEDs, such as VCMTS NED 24, CMTS NED 26 AND RPHY NED 28. Orchestration module 20 also makes device configuration commands available over a network-wide, multivendor command line interface (CLI), application programming interfaces (APIs), and user interfaces using the various NEDs, such as VCMTS NED 24, CMTS NED 26 AND RPHY NED 28. In various embodiments, VCMTS NED 24, CMTS NED 26 AND RPHY NED 28 together comprise a network-facing part of orchestration module 20. They may communicate over any native protocol supported by the respective network elements, such as Network Configuration Protocol (NETCONF), Representational State Transfer (REST), Extensible Markup Language (XML), CLI, and Simple Network Management Protocol (SNMP).

Elastic services controller 32 may obtain instructions from orchestration module 20 to generate a VCMTS instance with certain Day 0 configuration settings, for example, corresponding to CMTS 16. OpenStack™ (or any other type) of virtual machine (VM)/storage orchestrator 34 may initiate new VCMTS instance 38 with the specified Day 0 configuration settings. Orchestration module 20 may inform service manager 12 about spawning of new VCMTS instance 38. Service manager 12 may store the topology information in topology DB 42.

In some embodiments, new VCMTS instance 38 may connect to VCMTS state database 40 and synchronize substantially all configuration information, including Day 0 and Day 1 configuration settings and other communication parameters therein associated with active VCMTS instance 36. In a general sense, Day 1 configuration settings enable creating a communication tunnel (e.g., communication channel using an overlay/encapsulation network) between two network entities. Note that communication between active VCMTS instance 36 and R-PHY entity 14 may involve various changes to configuration settings and communication parameters (e.g., channels, carrier-to-noise ratio, signal-to-noise ratio, modulation error ratio, etc.); such changes, including the underlying configuration settings and communication parameters may be comprised in a state of active VCMTS instance 36. The state, including Day 0 and Day 1 configuration settings of active VCMTS instance 36 may be stored in external (i.e., to the VCMTS instance) VCMTS state database 40 as state information. New VCMTS instance 38 may form a communication tunnel with R-PHY entity 14 and active VCMTS instance 36 using the state information obtained from VCMTS state database 40. In various embodiments, new VCMTS instance 38 may monitor VCMTS state database 40 to ensure no modem online/offline activity for a predetermined time interval (e.g., one minute).

In other embodiments, underlay configurator 44 may provide VCMTS NED 24 and may RPHY NED 28 with appropriate Day 1 configuration settings that enable creation of the communication tunnel between new VCMTS instance 38 and R-PHY entity 14. In a general sense, underlay configurator 44 manages configuration of communication tunnels between R-HY entity 14 and any VCMTS instances and/or CMTS 16. The IP addresses for the tunnel endpoints may be selected by service manager 12. Underlay configurator 44 pushes down the configuration to create the tunnel. In addition, underlay configurator 44 assures sufficient bandwidth for the tunnel from the VCMTS instances to the network gateway. Underlay configurator 44 also configures various network elements (both virtual and physical) to direct downstream packets to the proper VCMTS instance. In some embodiments, the VCMTS instances can act as standalone nodes in respective network paths. In such cases, underlay configurator 44 ensures that packets are routed to the VCMTS instances appropriately. In other embodiments, the VCMTS instances comprise end of service chains. In such cases, underlay configurator 44 ensures that packets are routed to the beginning of respective service chains. In some embodiments, VCMTS NED 24 may configure new VCMTS instance 38 with appropriate Day 1 configuration settings. RPHY NED 28 may configure R-PHY entity 14 with appropriate Day 1 configuration settings that enable it to communicate with new VCMTS instance 38.

In yet other embodiments, underlay configurator 44 may facilitate creating a communication tunnel between active VCMTS instance 36 and new VCMTS instance 38. The communication tunnel may facilitate minimal disruption in packet flows when a switchover occurs. Moreover, state may be communicated between active VCMTS instance 36 and new VCMTS instance 38 in the communication tunnel between them. New VCMTS instance 38 may form a communication tunnel with R-PHY entity 14 using the state information obtained directly from active VCMTS instance 36.

Thereafter, new VCMTS instance 38 may synchronize its clock with 1588 timing server 51. New VCMTS instance 38 may inform R-PHY entity 14 to make its tunnels active with new VCMTS instance 38. Thereafter, substantially all upstream traffic flows to new VCMTS instance 38 from R-PHY entity 14, completing the upstream traffic switchover. New VCMTS instance 38 may inform orchestration module 20 to switch downstream traffic to new VCMTS instance 38. Thereafter, new VCMTS instance 38 becomes the source of state information in VCMTS state database 40. Thus, updates to configuration settings at new VCMTS instance 38 may be stored in VCMTS state database 40; changes to configuration settings of active VCMTS instance 36 may be ignored.

In various embodiments, orchestration module 20 may insert a route (e.g., Ethernet to Ethernet) in active VCMTS instance 36 to forward traffic to new VCMTS instance 38 in a service chain. The route can quickly send any downstream traffic received at active VCMTS instance 36 to new VCMTS instance 38 while network routing changes are implemented to direct traffic to new VCMTS instance 38 from other network elements in data center network 50. In various embodiments, orchestration module 20 reprograms data center network 50 and the backbone network to divert backhaul traffic to new VCMTS instance 38. Depending on where in the network or which data center new VCMTS instance 38 was spawned, completion of the route change could take several steps and a longer time. For example, the route change may involve reprogramming gateway routers to forward traffic directed to the data center network of active VCMTS instance 36 towards the data center network of new VCMTS instance 38; forwarding tables of substantially all switches and routers in the network path of downstream traffic may be updated to reflect the change from active VCMTS instance 36 to new VCMTS instance 38. In various embodiments, after network route changes are completed, orchestration module 20 (e.g., through OpenStack VM/Storage Orchestrator 34) may kill (e.g., delete, inactivate, etc.) active VCMTS instance 36.

According to various embodiments of communication system 10, the distance between data centers where active VCMTS instance 36 and new VCMTS instance 38 are located and the associated latency may be irrelevant to the migration process. There is no need for a special high speed link between active VCMTS instance 36 and new VCMTS instance 38. VCMTS migration can be achieved even if the VMs executing the respective VCMTS instances use SR-IOV or direct path 10. VCMTS migration can be performed irrespective of the underlying hypervisor technology (e.g., eSXI, KVM, etc.) Active VCMTS instance 36 and new VCMTS instance 38 need not be located in the same subnet of the cable modem network. There is no need to throttle down any CPUs or to disable No eXecution (NX) bit, thus preventing packet drops and security vulnerabilities.

Embodiments of communication system 10 provide a generic method of migrating VCMTS instances from one server to another or between data centers without any special high speed links between the two, networking IP address restrictions or specific hypervisor technology. An external database services is used to store and sync active VM state. Such database technologies may be routinely deployed as part of the data center infrastructure, and may not require any special handling of existing network processes. Note that although the present disclosure described migration of VCMTS instances, the systems and methods disclosed herein can be extended to virtually any suitable VM that can store its state in an external database.

Turning to the infrastructure of communication system, the cable modem network can include any number of cable modems, customer premises equipment, servers, switches (including distributed virtual switches), routers, and other nodes inter-connected to form a large and complex network that supports cable modem protocols such as Data Over Cable Service Interface Specification (DOCSIS). In particular, the cable modem network comprises cable modems distributed in various geographic locations, communicatively coupled over radio frequency communication to one or more R-PHY entity 14, which in turn communicates with CMTS 16 and/or VCMTS instances (e.g., active VCMTS instance 36 and/or standby VCMTS instance 38).

In a general sense, the network also represents a series of points or nodes of interconnected communication paths for receiving and transmitting packets and/or frames of information that are delivered to the communication system. A node may be any electronic device, computer, printer, hard disk drive, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

The network offers a communicative interface between cable modem network components, and may include any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Network 11 may implement any suitable communication protocol for transmitting and receiving data packets within the communication system. The architecture of the present disclosure may include a configuration capable of TCP/IP, TDMA, and/or other communications for the electronic transmission or reception information in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of the communication system. It should be understood that the communication system shown in FIG. 1 is simplified for ease of illustration.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In particular embodiments, the VCMTS instances (e.g., active VCMTS instance 36 and/or new VCMTS instance 38) may comprise a software application executing on a specialized hardware appliance (e.g., suitably configured server) with appropriate ports, processors, memory elements, interfaces, and other electrical and electronic components that facilitate the functions described herein. In some embodiments, the various modules in the VCMTS instances (e.g., active VCMTS instance 36 and/or new VCMTS instance 38) may execute on separate hardware devices and/or comprise software applications or combination thereof that perform the operations described herein.

R-PHY entity 14 may comprise suitable hardware components and interfaces for facilitating the operations described herein. In some embodiments, R-PHY entity 14 may be embedded in or be part of another hardware component, such as a broadband processing engine (comprising a motherboard, microprocessors and other hardware components). In some embodiments, the R-PHY entity comprises downstream and upstream PHY, deployed in a Coaxial Media Converter (CMC) that supports RF functions at the PHY layer.

Note that is some embodiments, VCMTS instances (e.g., active VCMTS instance 36 and/or new VCMTS instance 38) and R-PHY entity 14 may be located in a same chassis; in other embodiments, the VCMTS instances (e.g., active VCMTS instance 36 and/or new VCMTS instance 38) and R-PHY entity 14 may be located in different physical locations, remote from each other and coupled over a Layer 2 or Layer 3 network with various other network elements, such as switches and routers intervening there between.

Note that the cable modem network can include any number of VCMTS instances, each VCMTS instance connected to a plurality of R-PHY entities, each of which is connected to multiple cable modems (CMs) within the broad scope of the embodiments. The VCMTS instance and R-PHY entity together comprise a Converged Cable Access Platform (CCAP), which is typically a combination of a DOCSIS CMTS and an edge QAM (EQAM). Note that each VCMTS may comprise a virtual instance of a CMTS, configured with appropriate functionalities, configuration settings, and network interfaces to emulate the physical CMTS.

The physical CMTS 16 may provide one or more network functions (e.g., a network function comprises a building block within an operator's network infrastructure with well-defined external interfaces and well-defined functional behavior). The VCMTS instances may also provide the exact same network functions as the equivalent CMTS 16, except that they are deployed in a virtualized environment. VCMTS and R-PHY entity can communicate over a converged interconnect network (CIN) that can span across different geographic locations in some embodiments; in other embodiments, the CIN may comprise a set of interfaces within the same chassis. The network may also include a one or more CMTS connected to the R-PHY entities.

Figure 2:
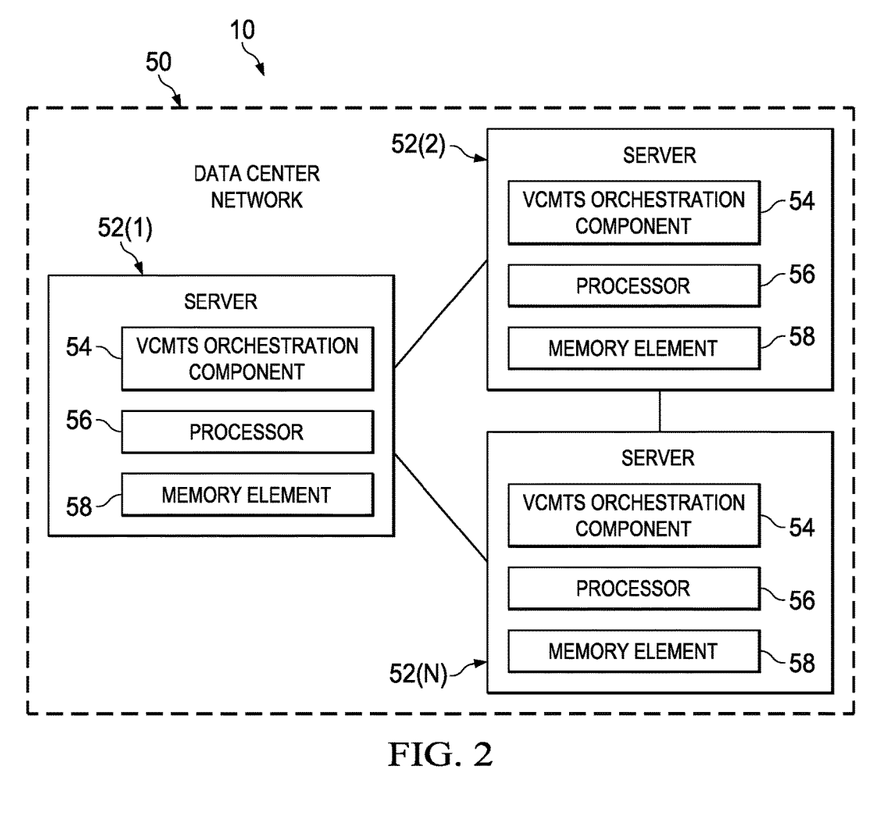
FIG. 2 is a simplified block diagram illustrating example details of embodiments of the communication system.

Turning to FIG. 2, FIG. 2 is a simplified block diagram illustrating an example implementation of communication system 10. A data center network 50 may comprise a plurality of interconnected servers 52(1)-52(N), each including its own separate processor 56 and memory element 58. In some embodiments, each server 52(1)-52(N) may be deployed on separate blades of a server rack; in other embodiments, each server 52(1)-52(N) may be identified by separate network addresses, but may execute in the same server blade. Each server 52(1)-52(N) may host one or more VCMTS orchestration component 54. VCMTS orchestration component 54 may comprise, by way of examples and not as limitations, orchestration module 20, DHCP server 18, elastic services controller 28, redundancy manager 48, and VCMTS state database 40. For example, orchestration module 20 may execute in server 52(1); elastic services controller 32 may execute in server 52(2), and active VCMTS instance 36 may execute in server 52(N). Note that such an implementation facilitates a distributed execution of communication system 10 in data center network 50.

Figure 3:
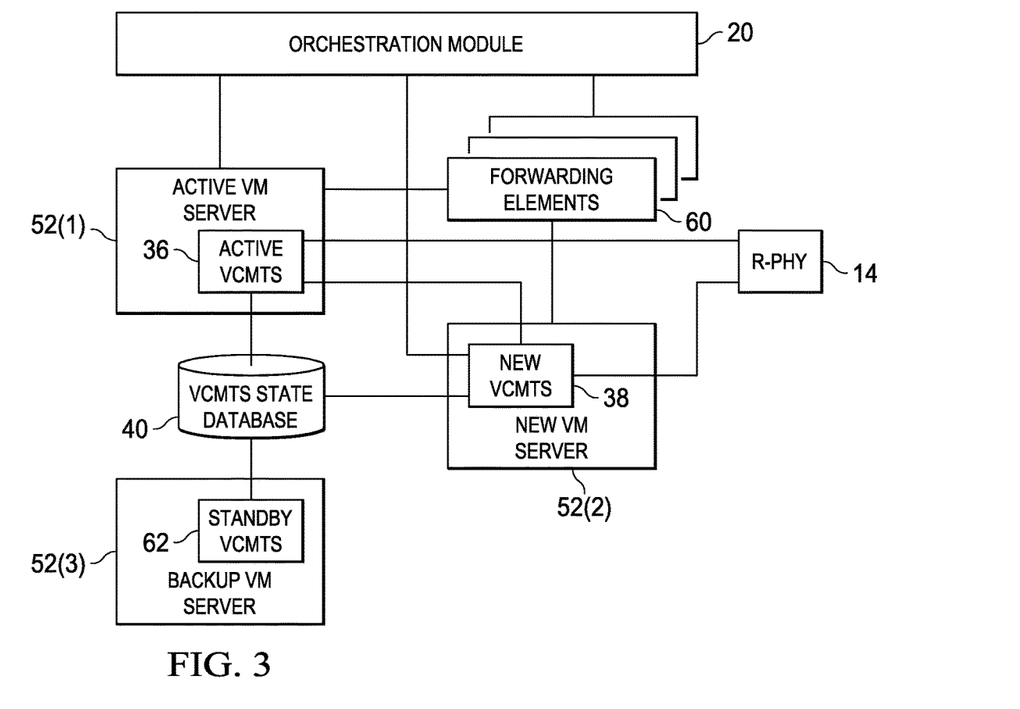
FIG. 3 is a simplified block diagram illustrating other example details of embodiments of the communication system.

Turning to FIG. 3, FIG. 3 is a simplified block diagram illustrating VCMTS migration according to an example embodiment. Orchestration module 20 monitors VM traffic to active VM server 52(1) and determines that active VCMTS instance 36 is to be migrated. Orchestration module 20 facilitates spawning new VCMTS instance 38 on oversubscribed server 52(2). Backhaul connectivity for new VCMTS instance 38 is created with forwarding elements 60 in data center network 50. Forwarding elements 60 can include virtual switches, physical switches, routers, and other network elements that facilitate forwarding packets in data center network 50.

New VCMTS instance 38 connects to VCMTS state database 40, which stores state of active VCMTS instance 36. New VCMTS instance 38 synchronizes its state with the state information in VCMTS state database 40. Using the state information, new VCMTS instance 38 creates a communication tunnel with R-PHY entity 14. New VCMTS instance 38 locks its time with 1588 timing server 51 and R-PHY entity 14. In some embodiments, new VCMTS instance 38 may monitor VCMTS state database 40 to ensure no modem online/offline activity for a predetermined time interval (e.g., 1 minute). New VCMTS instance 38 informs R-PHY entity 14 to make its tunnels active. Thereafter, upstream traffic flows to new VCMTS instance 38, completing upstream switchover. New VCMTS instance 38 notifies orchestration module 20 to switch downstream traffic. Thereafter, new VCMTS instance 38 becomes the source of state information in VCMTS state database 40 for that particular instance of CMTS 16.

Orchestration module 20 installs a route in active VCMTS instance 36 to forward traffic to new VCMTS instance 38 Ethernet to Ethernet Service Chain. The route can quickly send downstream traffic to new VCMTS instance 38 via active VCMTS instance 36, without any other network infrastructure programming. In some embodiments, orchestration module 20 reprograms forwarding elements 60 to divert backhaul traffic to new VCMTS instance 38. Depending on where in the network or which data center new VCMTS instance 38 was spawned, the process could take several steps and a longer time. Finally, orchestration module 20 kills active VCMTS instance 36. Thereafter, all downstream and upstream traffic flows to new VCMTS instance 38.

In some embodiments, active VCMTS instance 36 may be associated with a standby VCMTS instance 62 in backup VM server 52(3). Standby VCMTS instance 62 may maintain its state through synchronization with state information in VCMTS state database 40. After switchover to new VCMTS instance 38 is complete, the state information in VCMTS state database 40 is associated with new VCMTS instance 38; thus, standby VCMTS instance 62 may be automatically associated with new VCMTS instance 38 without any further action.

Figure 4:
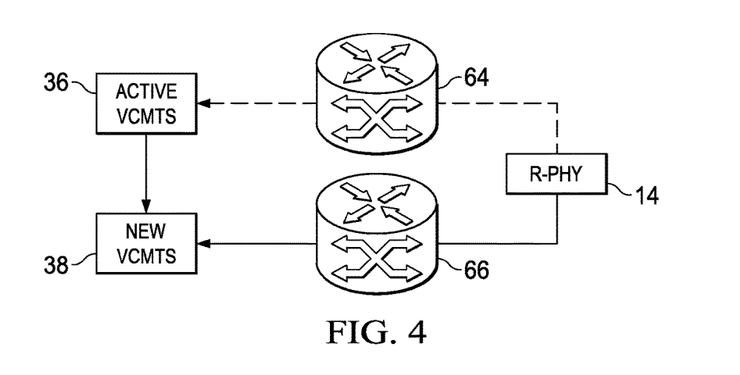
FIG. 4 is a simplified block diagram illustrating yet other example details of embodiments of the communication system.

Turning to FIG. 4, FIG. 4 is a simplified block diagram illustrating an example switchover scenario for upstream traffic according to an example embodiment of communication system 10. Upstream traffic (e.g., traffic from R-PHY entity 14 to CMTS 16) may be sent to active VCMTS instance 36 in a default mode over appropriate communication tunnels. Assume that active VCMTS instance 36 is migrated to new VCMTS instance 38. New VCMTS instance 38 instructs R-PHY entity 14 to switch to the communication tunnel with new VCMTS instance 38. Thereafter, R-PHY entity 14 sends upstream traffic to new VCMTS instance 38.

Figure 5:
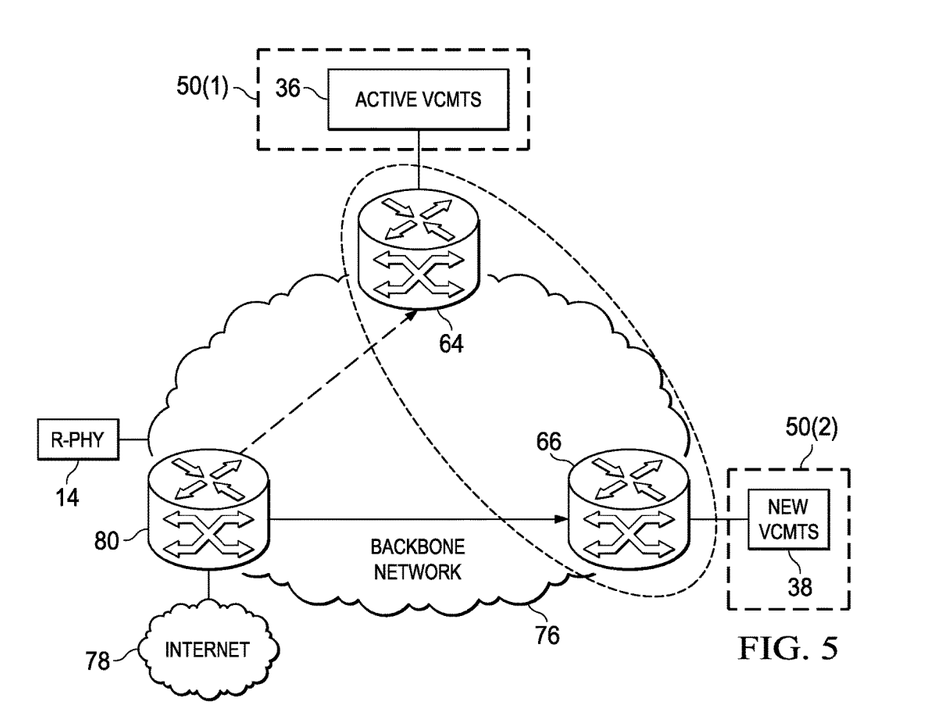
FIG. 5 is a simplified block diagram illustrating other example details of embodiments of the communication system.

Turning to FIG. 5, FIG. 5 is a simplified block diagram illustrating an example switchover scenario for downstream traffic according to an example embodiment of communication system 10. Downstream traffic may be communicated to active VCMTS instance 36 over a backbone network 76 through Internet 78 (or other wide area network). Note that backbone network 76 comprises a part of computer network infrastructure that interconnects various pieces of network, such as data center network 50(1) and data center network 50(2), providing a path for the exchange of information between the various interconnected pieces. For example, downstream traffic may comprise subscription information, video and audio data, etc., which is generally transmitted (after receipt over backbone network 76) by active VCMTS instance 36 to R-PHY 14 and from there to various cable modems.

Assume, merely for example purposes and not as a limitation, that active VCMTS instance 36 is implemented in data center network 50(1), and new VCMTS instance 38 is implemented in data center network 50(2). When active VCMTS instance 36 is active, downstream traffic from Internet 78 is routed over backbone network 76 to router 64 of data center network 50(1), and therefrom to active VCMTS instance 36. Assume that active VCMTS instance 36 is migrated to new VCMTS instance 38. Thereupon orchestration module 20 reprograms backbone network 76 (e.g., by configuring gateway router 80) to route packets destined to active VCMTS instance 36 to router 66 corresponding to data center network 50(2). Thereafter, packets received from Internet 78 are routed seamlessly and transparently to router 66 and on to new VCMTS instance 38 executing in data center network 50(2). Thereafter, new VCMTS instance 38 transmits the downstream data to R-PHY entity 14 for distribution to various cable modems.

Figure 6:
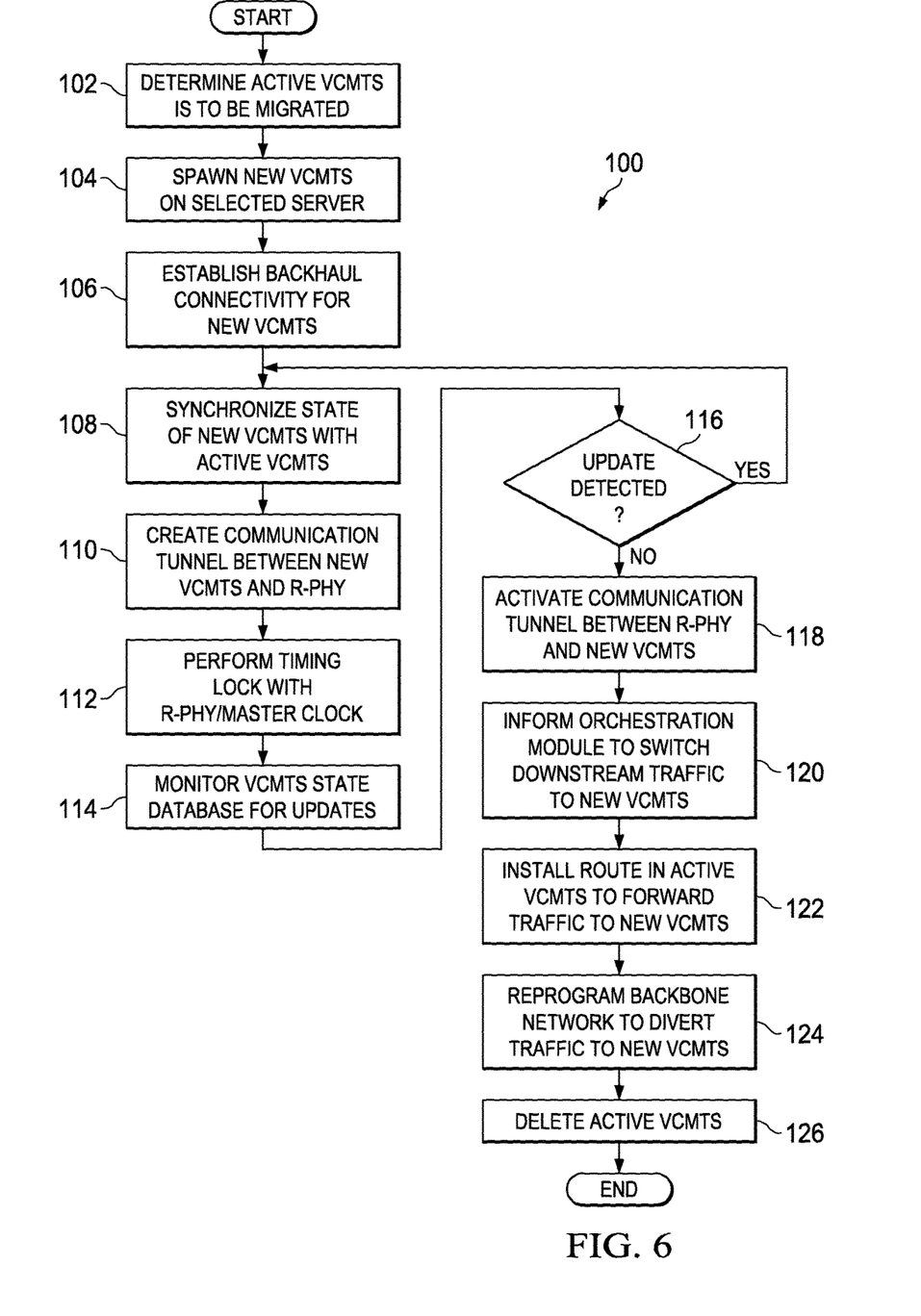
FIG. 6 is a simplified flow diagram illustrating example operations that may be associated with an embodiment of the communication system.

Turning to FIG. 6, FIG. 6 is a simplified flow diagram illustrating example operations 100 that may be associated with an embodiment of communication system 10. At 102, orchestration module 20 may determine that active VCMTS instance 36 is to be migrated. At 104, orchestration module 20 facilitates spawning new VCMTS instance 38 on a selected server. At 106, backhaul connectivity may be established for new VCMTS instance 38, for example, by setting up appropriate communication tunnels with R-PHY entity 14 and forwarding elements 60. At 108, the state (e.g., including power level, frequency, modulation, coding, multiplexing, contention control, radio frequency communication paths, subscribers, etc.) of new VCMTS instance 38 may be synchronized with that of active VCMTS instance 36 stored in VCMTS state database 40.

At 110, a communication tunnel may be created between new VCMTS instance 38 and R-PHY entity 14. At 112, new VCMTS instance 38 may perform a timing lock with R-PHY entity 14 and master clock at 1588 timing server 51. At 114, new VCMTS instance 38 may monitor VCMTS state database 40 for any updates to the state information stored therein. If an update is detected at 116, the operations revert to 108, at which the state of new VCMTS instance 38 is synchronized with the state information stored in VCMTS state database 40. On the other hand, if updates are not detected at 116, at 118, new VCMTS instance 38 instructs R-PHY entity 14 to activate communication tunnel between R-PHY entity 14 and new VCMTS instance 38.

At 120, new VCMTS instance 38 may inform orchestration module 20 to switch downstream traffic to new VCMTS instance 38. At 122, orchestration module 20 may install a route in active VCMTS instance 36 to forward traffic to new VCMTS instance 38. Such route may be a stop-gap measure to accommodate data traffic during network wide re-routing at 124, at which orchestration module 20 reprograms backbone network 76 to divert traffic to new VCMTS instance 38. At 126, after traffic reprogramming is complete, active VCMTS instance 36 may be deleted.

Note that although the operations and systems are described herein with respect to a VCMTS, the operations and systems may be used with any virtual network function, including load-balancers, firewalls, WAN accelerators, etc., and the appliances that are associated therewith (e.g., customer premises equipment (CPE), cable modem (CM), etc.)

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the VNFs and associated servers described and shown herein (and/or their associated structures) may also include suitable interfaces for receiving, transmitting, and/or otherwise communicating data or information in a network environment. The VNFs described herein may be provisioned on servers comprising memory elements and processors. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 58) can store data used for the operations described herein. This includes the memory element being able to store instructions (e.g., software, logic, code, etc.) in non-transitory media, such that the instructions are executed to carry out the activities described in this Specification. A processor (e.g., processor 56) can execute any type of instructions associated with the data to achieve the operations detailed herein in this Specification. In one example, processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in the communication system could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, the communication system may be applicable to other exchanges or routing protocols. Moreover, although the communication system has been illustrated with reference to particular elements and operations that facilitate the communication process, these elements, and operations may be replaced by any suitable architecture or process that achieves the intended functionality of the communication system.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
spawning, by an orchestration component executing using a processor, a first instance of a virtual network function (VNF) on a first server in a cable modem network, wherein the VNF is associated with a specific hardware interface in the cable modem network;
storing state of the first instance as state information in an external database;
spawning a second instance of the VNF on a second server, the second server being different from the first server;

synchronizing state of the second instance with the state information stored in the external database, wherein synchronizing includes associating the second instance with the specific hardware interface;

creating a first communication tunnel between the second instance and a remote physical layer (R-PHY) entity in the cable modem network, wherein the R-PHY entity is communicatively coupled to the first instance and communicates data traffic with the first instance;

creating a second communication tunnel between the first instance and the second instance;

communicating heartbeat messages between the first instance and the second instance over the second communication tunnel;

switching over the data traffic to the first communication tunnel between the second instance and the R-PHY entity; and deleting the first instance.

2. The method of claim 1, wherein subsequent to synchronizing state of the second instance with the state information stored in the external database, updates to the state of the second instance result in updates to the state information stored in the external database and updates to the state of the first instance are ignored.

3. The method of claim 1, wherein the VNF comprises a virtual cable modem termination system (VCMTS).

4. The method of claim 1, further comprising instructing the R-PHY entity to forward upstream data traffic to the second instance.

5. The method of claim 1, wherein the states of the first instance and the second instance comprise configuration settings and communication parameters associated with communication channels between one or more cable modems and the R-PHY entity coupled to the first instance and the second instance, respectively.

6. The method of claim 1, further comprising reprogramming a backbone network to route downstream data traffic to the second instance, wherein the first server is located in a first network and the second server is located in a second network physically separate and remote from the first network and connected over the backbone network, wherein the downstream data traffic arrives from a third network destined to the first instance.

7. The method of claim 1, further comprising installing a route in the first instance to forward traffic reaching it to the second instance.

8. The method of claim 1, further comprising synchronizing timing of the second instance using a master clock running on a timing server in the network.

9. The method of claim 1, further comprising monitoring the database for any change of the state information during a predetermined time interval.

10. A non-transitory computer readable media that includes instructions for execution, which when executed by a processor, performs operations comprising:

spawning, by an orchestration component executing using the processor, a first instance of a virtual network function (VNF) on a first server in a cable modem network, wherein the VNF is associated with a specific hardware interface in the cable modem network;

storing state of the first instance as state information in an external database;

spawning a second instance of the VNF on a second server, the second server being different from the first server;

synchronizing state of the second instance with the state information stored in the external database, wherein synchronizing includes associating the second instance with the specific hardware interface;

creating a first communication tunnel between the second instance and a remote physical layer (R-PHY) entity in the cable modem network, wherein the R-PHY entity is communicatively coupled to the first instance and communicates data traffic with the first instance;

creating a second communication tunnel between the first instance and the second instance;

communicating heartbeat messages between the first instance and the second instance over the second communication tunnel;

switching over the data traffic to the first communication tunnel between the second instance and the R-PHY entity; and deleting the first instance.

11. The non-transitory computer readable media of claim 10, wherein the VNF comprises a virtual cable modem termination system (VCMTS).

12. The non-transitory computer readable media of claim 10, wherein the states of the first instance and the second instance comprise configuration settings and communication parameters associated with communication channels between one or more cable modems and the R-PHY entity coupled to the first instance and the second instance, respectively.

13. The non-transitory computer readable media of claim 10, wherein the operations further comprise installing a route in the first instance to forward traffic reaching it to the second instance.

14. An apparatus, comprising:
a memory element for storing data; and
a processor, wherein the processor executes instructions associated with the data, wherein the processor and the memory element cooperate, such that the apparatus is configured for:

spawning a first instance of a virtual network function (VNF) on a first server in a cable modem network, wherein the VNF is associated with a specific hardware interface in the cable modem network;

storing state of the first instance as state information in an external database;

spawning a second instance of the VNF on a different second server, the second server being different from the first server;

synchronizing state of the second instance with the state information stored in the external database, wherein the synchronizing includes associating the second instance with the specific hardware interface;

creating a first communication tunnel between the second instance and a remote physical layer (R-PHY) entity in the cable modem network, wherein the R-PHY entity is communicatively coupled to the first instance and communicates data traffic with the first instance, and wherein the second instance is operative to inform the R-PHY to form the communication tunnel;

creating a second communication tunnel between the first instance and the second instance;

communicating heartbeat messages between the first instance and the second instance over the second communication tunnel;

switching over the data traffic to the first communication tunnel between the second instance and the R-PHY entity; and deleting the first instance.

15. The apparatus of claim 14, wherein the VNF comprises a virtual cable modem termination system (VCMTS).

16. The apparatus of claim 14, wherein the states of the first instance and the second instance comprise configuration settings and communication parameters associated with communication channels between one or more cable modems and the R-PHY entity coupled to the first instance and the second instance, respectively.

17. The apparatus of claim 14, further configured for installing a route in the first instance to forward traffic reaching it to the second instance.

18. The apparatus of claim 14, wherein the R-PHY comprises a downstream PHY and an upstream PHY.

19. The apparatus of claim 14, wherein the VNF and the R-PHY are located in a same chassis.

20. The apparatus of claim 14, wherein the VNF is located in a remote location from the R-PHY.

* * * * *